Aug. 3, 1965

F. J. LUKETA 3,198,488

CABLE METER FOR TRAWLERS

Filed May 3, 1960

INVENTOR.
FRANK J. LUKETA
BY
Reynolds, Beach & Christensen
ATTORNEYS

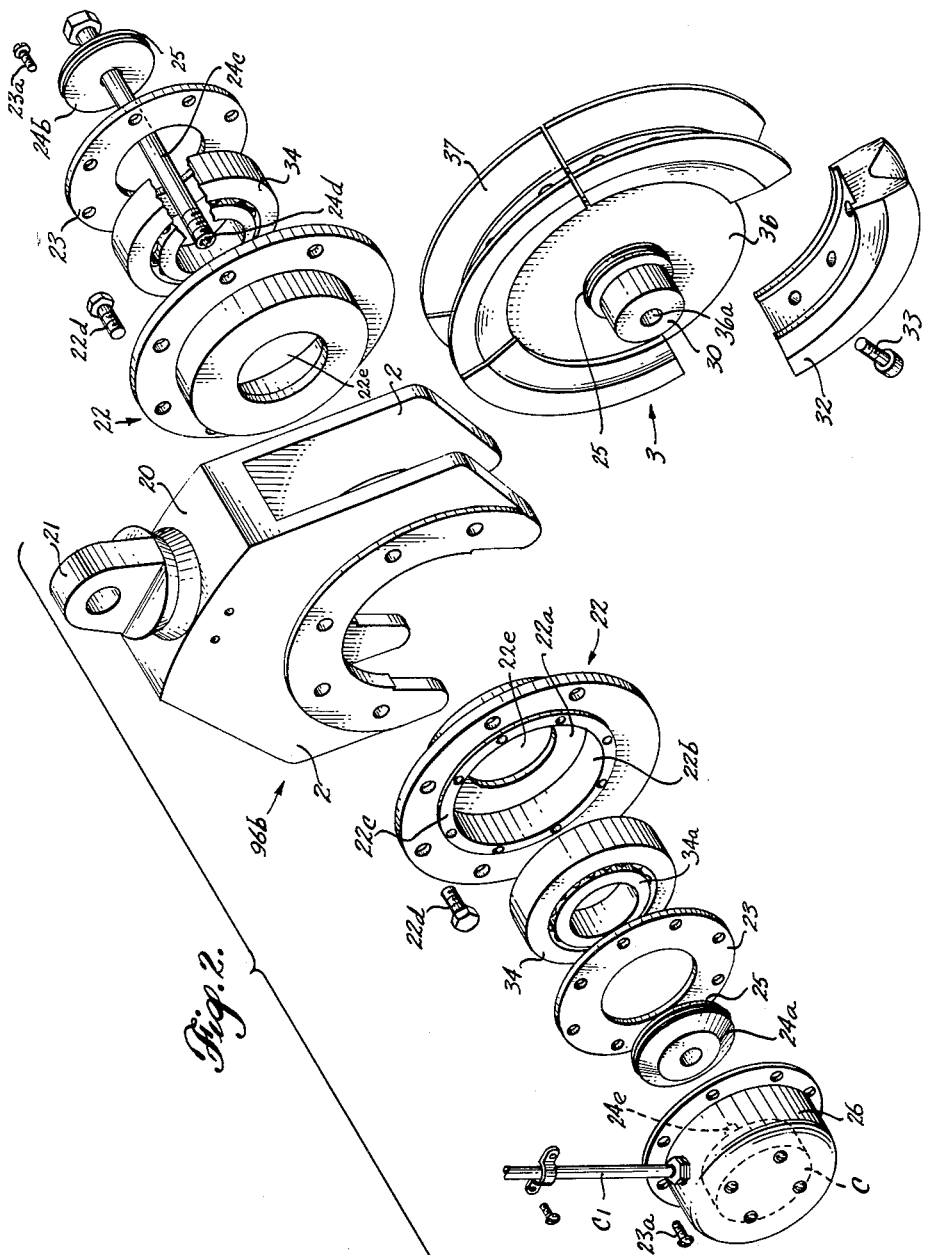

Aug. 3, 1965   F. J. LUKETA   3,198,488
CABLE METER FOR TRAWLERS
Filed May 3, 1960   3 Sheets-Sheet 3
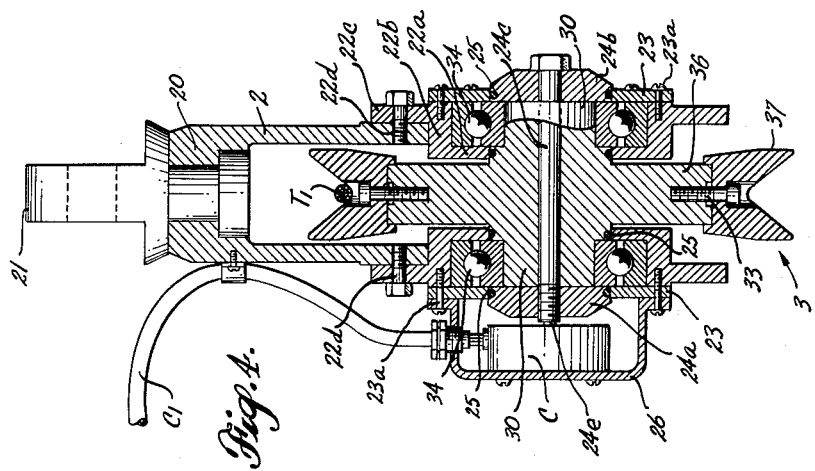
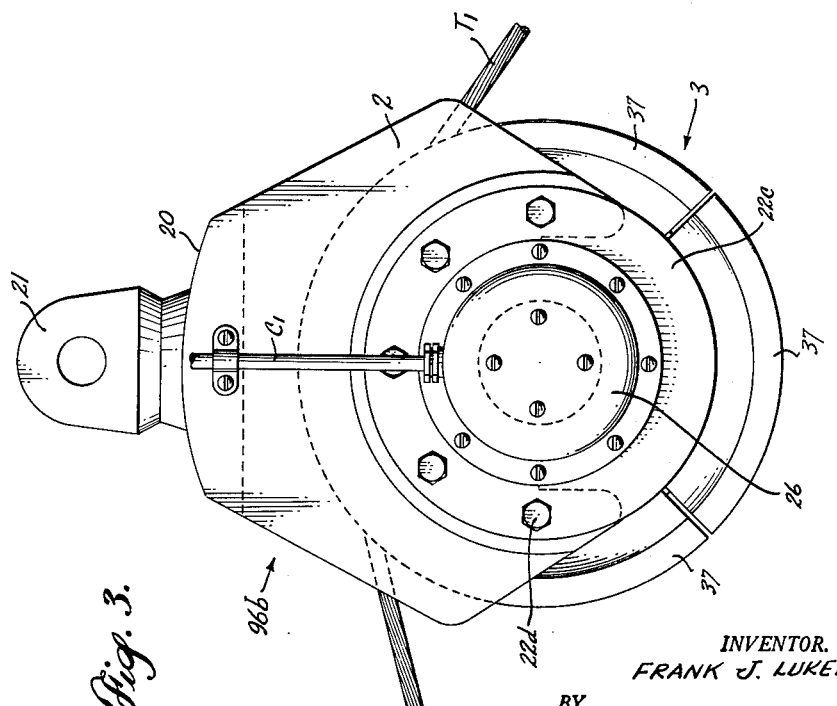
INVENTOR.
FRANK J. LUKETA
BY
Reynolds, Beach & Christensen
ATTORNEYS

United States Patent Office 3,198,488
Patented Aug. 3, 1965

3,198,488
CABLE METER FOR TRAWLERS
Frank J. Luketa, 5567 Greenwood, Seattle, Wash.
Filed May 3, 1960, Ser. No. 26,554
7 Claims. (Cl. 254—192)

During trawling in accordance with the drum trawling method a towing warp extends over each side of the trawling vessel and so aft and outboard to doors at the respective forward ends of net curtains. The doors are designed to spread the curtains widely. If however the towing warps are of materially unequal length, one door will be ahead of the other, and so will drag the bosom of the net at one side ahead of the bosom at the opposite side. If the net is thus unbalanced appreciably it may tend to collapse inwardly, and certainly its throat is narrowed, and stresses are set up which may result in rips in the web of the body of the net, as the resistance of the progressively larger catch builds up during the drag or towing period. It is therefore quite necessary to be sure that the two warps are let out by like amounts, and are even when towing.

The warps are normally reeled upon separate and independently operable winch drums, and depending upon the manner in which they lie upon said drums one may pay out appreciably a greater length than the other. The warps are long, and usually several hundred fathoms are payed out, hence even a slight discrepancy per revolution of the drums may accumulate an unbearably large total error.

Cable meters are known and are sometimes used to measure the outrun of each warp. Even if accurate, which they are not usually, they inevitably impose a large gear element upon the cable, and impede proper handling of the line. They add to the time and labor involved in setting a net, and in hauling the same, and are expensive. Including as they do a sheave riding upon the line and by its rotation measuring the outrun, they are subject to wear and cable grease build up, with the result that they can easily vary by a fraction of an inch in circumference. Multiplying such an error with the hundreds or thousands of revolutions required to pay out the proper length of warp, it can be seen that two such cable meters on the respective warps can readily pay out the warps unevenly, though reading equally, even to the extent of collapsing the net and rendering it inoperative.

One object of this invention is to incorporate cable meters with two of the blocks which are required in any event for guiding and handling each warp, whereby the bulk and work connected with separate cable meters, as presently used, can be avoided. This eliminates two separate pieces of gear, and reduces cluttering of deck space which at best is minimal. It also reduces the cost of the gear, for the cost of the combined line-handling sheave and meter is less than the cost of a line-handling sheave and a separate cable meter, which latter also requires a sheave plus two guide and pressure wheels.

Since the accuracy of a cable meter is dependent upon the exactness of the circumferential extent of the measuring sheave, and since a line-handling sheave may be expected to wear more rapidly than a sheave which is merely for measuring, it is also an object to form a sheave for the dual purpose which has replaceable rim segments, whereby any wear can be compensated for from time to time by removing and replacing old segments, even though the segments, being replaceable, can be hardened and rendered less subject to wear.

Cable meters for trawlers do not have to measure precisely the length of cable payed out, so long as the two required meters match each other in any possible error so that the two warps remain even, and the segmented sheave design provides an economical method of keeping the meters matched after wear.

In cable meters it is recognized as desirable for accuracy to have as large a measuring sheave as possible, since errors are minimized with fewer revolutions, and this accords with the fact that the warp block sheaves are large (from one to eight feet in diameter) of necessity to insure long life for the expensive warp cables. Yet in other designs which do not utilize the warp block as a meter but wherein the meter is a separate entity this is not possible because of bulk and suspension difficulties.

Warp cables are greased to retard salt water corrosion and this tends to make known meters unreliable, since the hardened grease at times builds up on the sheave and varies the effective circumference of the sheave; the spring reacting from the two opposing guide wheels to urge the metering sheave against the warp can not always push the sheave through the grease to contact the cable directly. The sheave in the above design is covered with a layer of neoprene to provide the necessary contact friction with the cable.

The present invention inherently solves this grease problem since the pressure on the sheave of the trawl warp is many hundreds of pounds, far more than can be produced by springs in the known meters.

Cable meters in such service are exposed to the corrosive effects of weather and sea, and it is a further object to make such a sheave and associated meter in a form that is well protected, especially the bearings that support the sheave, and which is easily disassembled for inspection or replacement of parts, and easily reassembled.

Further objects, and especially such as have to do with details of construction, will appear hereinafter.

The drawings show the sheave and associated revolution counter, constituting together the cable meter, in a preferred form and arrangement.

FIGURE 2 is an exploded isometric view of the cable meter.

FIGURE 3 is a side elevational view of the cable meter, and FIGURE 4 is an axial sectional view through the same.

Figure 1:
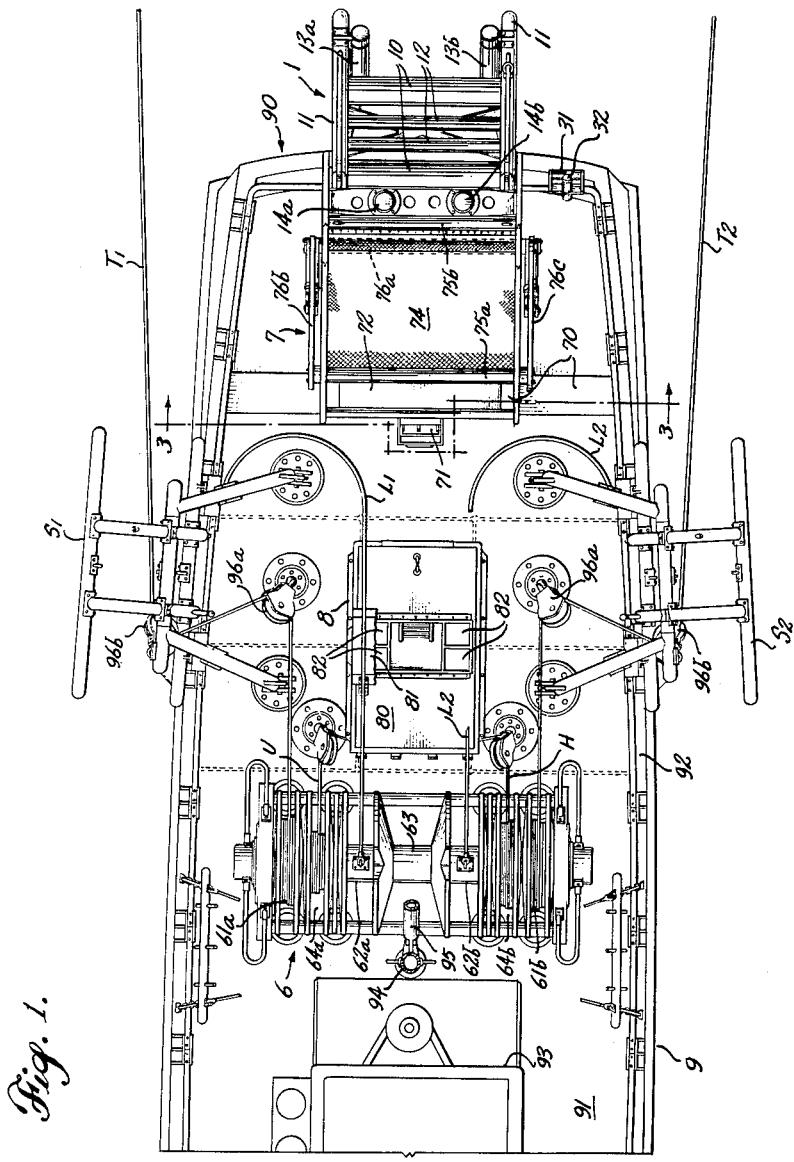
FIGURE 1 is a plan view of the after deck of a trawler such as would employ the cable meter of this invention.

A brief explanation of the trawler and its gear will make clear the place and function of the cable meter of this invention. A trawler hull 9, the stern whereof is at 90, and the bulwarks at 92, supports upon its after deck 91, just aft of its deck house 93, a mast 94 and boom 95. A multiple drum winch 6 is located immediately aft of the mast, oriented athwartship. Immediately aft of the winch a hatch 8 with its main hatch cover 80 and auxiliary hatch cover 81 opens to the hold space below, the catch being delivered thereinto through chutes 82. Aft of the hatch is a segregating station, at 7, including debris chutes 70, a container for cleaned catch (normally shrimp) at 71, a segregating table 72, and a bin to receive the catch, including a flexible bottom 74 secured along opposite edges 75a, 75b, and capable of being raised by a bar 76a when the same is raised by lifting arms 76b, 76c. At or outboard of the stern a ramp 1 guides and supports the net as it is hauled aboard, supporting it on rollers 10 and 12, and guiding it at 14a, 13a, and 14b, 13b, and between upstanding side guides 11. Elements 31, 32 are line guides used in setting the net.

Stanchions S1 and S2, which carry the combination warp blocks and meters 96b, cooperate with the respective doors (not shown) to secure the doors during final stages of hauling and emptying the net.

The winch 6 has a number of coaxial but independently operable drums. The central drum 63 winds on the net itself. Drums 62a, 62b reel in hauling lines L1, L2 which take the tension of the net after it has been hauled in to the extent to secure the doors at the stanchions S1, S2, and also haul in the net curtains. Drums 64a, 64b receive one the utility line U and the other the line H which is used for setting the net as well as trynet towing.

Drums 61a, 61b receive the towing warps T1, T2, which are guided by deck blocks 96a and by blocks 96b at the respective stanchions. It is with these towing warps and the accurate measurement of their outrun that this invention is concerned.

The various equipment used in the drum trawling method, and the method itself, are described in my co-pending continuation application Serial No. 338,256, filed January 16, 1964, and entitled Drum Trawling Apparatus and Method. The earliest filed predecessor of continuation application Serial No. 338,256 is now abandoned application Serial No. 570,771, filed March 12, 1956, and entitled Trawl Net Hauling Gear. The net handling equipment aboard the trawler is also disclosed in my U.S. Patent No. 3,065,562, issued November 27, 1962. The basic form of the winch mechanism is thoroughly disclosed in my U.S. Patent No. 2,954,209, issued September 27, 1960, and an improved form forms the subject matter of my copending application Serial No. 248,678, filed December 31, 1962, as a division of my prior, now abandoned, application Serial No. 836,636, which was filed on August 28, 1959. The shrimp segregator is disclosed in my U.S. Patent No. 3,052,354, issued September 4, 1962. The hatch afforded access between the deck and a hold space below the deck is described in my U.S. Patent No. 3,074,369, issued January 22, 1963.

The blocks 96a and 96b are a necessary part of the line-guiding means for the towing warps T1, T2, to direct them first outboard and then over the side and aft. It is convenient, therefore, to use one or the other such block as the cable meter. The cable meter may be assumed to be incorporated with the blocks 96b. The construction of the cable meter is shown in FIGURES 2, 3 and 4. It includes a pair of cheek plates 2 integrally joined to a saddle 20 which has a suspension eye 21 swiveled therein, the cheek plates being U-shaped and opening downwardly. The cheek plates are spaced apart sufficiently to receive the sheave 3, the hub portion 36 of which has integral and rabbeted trunnions 30 at its opposite faces. Segmental rim elements 37 are secured angularly about the hub portion by retaining screws 33 or the like. The rim segments 37 are of hard metal or other wear-resistant material, and when all segments are in place they define an exact circumferential extent, with relation to the line T1 or T2 running on the sheave.

The sheave is supported between the cheek plates 2 by means of anti-friction journal bearings 34 enclosed within annular retainers 22 and 23 that are detachably secured across the U-shaped openings of the cheek plates by means of screws 22d and 23a. The bores 22e in the inner retainers 22 are countersunk from their outside faces 22c and it will be seen that the bearings 34 are engaged between the end portions of the trunnions 30 and the axially-extending walls 22b of the flared portions of the bores, so as to locate the sheave in a radial sense with respect to the cheek plates. Location of the sheave in an axial sense is accomplished by passing a tie rod 24c through a hole 36a extending axially through its hub portion 36, and thereafter engaging the trunnions 30 and the inner races 34a of the bearings 34 between flange means on the ends of the tie rod in the form of washers 24b and nut 24a, the radially extending walls 22a of the flared portions of the bores 22e providing the inner stops for the races. It will also be apparent that in accord with this arrangement, the washers 24b, the nut 24a, and the tie rod 24c all will rotate with the sheave 3.

Weather and water are excluded from the bearings by rotative seals such as the O-rings 25 interposed between the radially inner edges of non-rotative retainers 22 and 23 and the rotative elements of the assembly.

A revolution counter C of any known or suitable construction is mounted within a casing 26 which is secured to a cheek plate, as by the screws 23a. It is actuated by an axially directed actuator 24e projecting from the counter engaging element that is rotative with the sheave—for example, the splined hole 24d in the tie rod 24c. The rotating sheave, through the counter, may actuate a distant magnetic indicator (not shown) through an electrical connection C1. Thus the cable meters at the opposite rails can be directly compared at a central point, for example, at the control station for winch 6, and the winch operator can so control drums 61a and 61b to make certain that the same length of cable T1, T2 is out from each such drum, at all times.

In trawling the warps T1, T2 are payed out until the net is properly oriented on or with respect to the bottom. The rate of paying out is regulated in accordance with the cable meters of the blocks at the opposite rails, and erratic movements of the net can be avoided if care is taken to keep the lines of equal length. When the net is to be hauled the same precautions, if observed, will prevent the net from becoming lop-sided, and possibly causing rips and losing some of its catch.

I claim as my invention:

1. A block comprising a sheave the hub portion of which is formed with opposed trunnions, a pair of cheek plate members having opposed bores including axially extending walls and flared portions countersunk from the outside faces thereof, said sheave being positioned between the cheek plate members with its trunnions extending into the bores thereof, flange means detachably mounted on the ends of the trunnions so as to be rotatable therewith, and journal bearings engaged between the end portions of the trunnions and the axially extending walls of the flared portions of the bores in the cheek plate members, so as to locate the sheave in a radial sense with respect to the cheek plate members, said flange means having a radial extent exceeding that of the end portions of the trunnions, the inner races of the bearings being engaged between the flange means and the radially extending walls of said flared portions of the bores, so as to locate the sheave in an axial sense with respect to the cheek plate members.

2. A block according to claim 1 wherein the cheek plate members include cheek plates having a U-shaped configuration and annular retainers detachably secured across the U-shaped openings of the cheek plates, the bores of said retainers being countersunk from the outside faces thereof.

3. A block according to claim 2 further comprising additional annular retainers detachably secured across the U-shaped openings of the cheek plates, the outer races of the bearings being engaged between said additional retainers and the radially extending walls of the flared portions of the bores in the first named retainers.

4. A block according to claim 1 wherein the end portions of the trunnions are of reduced configuration and the inner races of the bearings are also engaged between the flange means and the radially extending walls of said reduced end portions.

5. A block according to claim 1 wherein the rim portion of the sheave includes a series of segmental rim elements which are secured angularly about the hub portion in a closed circumferential line.

6. In trawling apparatus, a block comprising a sheave the hub portion of which is formed with opposed trunnions and a pair of cheek plate members having opposed bores countersunk from the outside faces thereof, said sheave being positioned between the cheek plate members with its trunnions extending into the bores thereof, flange means detachably mounted on the ends of the trunnions so as to be rotatable therewith, and journal bearings engaged between the end portions of the trunnions and the axially extending walls of the flared portions of the bores in the cheek plate members, so as to locate the sheave in a radial sense with respect to the cheek plate members, said flange means having a radial extent exceeding that of the end portions of the trunnions, the inner races of the bearings being engaged between the flange means and the radially extending walls of said flared portions of the bores, so as to locate the sheave in an axial sense with respect to the cheek plate members.

7. A block according to claim 1 wherein the hub portion of the sheave has a hole extending axially therethrough and the flange means are detachably mounted on the ends of a tie rod extending through the hole.

References Cited by the Examiner

UNITED STATES PATENTS

| 1,466,980 | 9/23 | Wilson | 254—192 |
| 1,619,793 | 3/27 | Kerr | 74—230.11 |
| 1,901,962 | 3/33 | Greene | 33—134 |
| 2,136,457 | 11/38 | Nixon | 33—134 |
| 2,272,826 | 2/42 | Bardsley | 254—193 |
| 2,277,386 | 3/42 | Brown | 254—190 X |
| 2,678,245 | 5/54 | Kirsch | 308—187.1 |
| 2,876,549 | 3/59 | Adamson et al. | 33—134 X |
| 2,940,173 | 6/60 | Crecelius | 33—134 |

FOREIGN PATENTS 4,094  2/10  Great Britain.

ISAAC LISANN, *Primary Examiner.*